(12) United States Patent
Harding et al.

(10) Patent No.: US 7,499,830 B2
(45) Date of Patent: Mar. 3, 2009

(54) COMPUTER-IMPLEMENTED TECHNIQUES AND SYSTEM FOR CHARACTERIZING GEOMETRIC PARAMETERS OF AN EDGE BREAK IN A MACHINED PART

(75) Inventors: Kevin George Harding, Niskayuna, NY (US); Jianming Zheng, Shanghai (CN); Yongqing Li, Ann Arbor, MI (US); Ming Jia, Shanghai (CN); Guiju Song, Shanghai (CN); Joseph Benjamin Ross, Cincinnati, OH (US); Ralph Gerald Isaacs, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 560 days.

(21) Appl. No.: 11/274,579

(22) Filed: Nov. 15, 2005

(65) Prior Publication Data
US 2007/0112543 A1  May 17, 2007

(51) Int. Cl.
*G06F 19/00* (2006.01)
(52) U.S. Cl. ..................... 702/167; 356/489
(58) Field of Classification Search ............... 702/167, 702/150–155, 182–185, 188; 356/489
See application file for complete search history.

(56) References Cited

U.S. PATENT DOCUMENTS

| | | | |
|---|---|---|---|
| 4,641,972 A | 2/1987 | Halioua et al. | |
| 4,727,390 A | 2/1988 | Brown | |
| 4,952,772 A * | 8/1990 | Zana ..................... 219/124.34 | |
| 4,983,043 A | 1/1991 | Harding | |
| 4,984,893 A | 1/1991 | Lange | |
| 5,069,548 A | 12/1991 | Boehnlein | |
| 5,189,493 A | 2/1993 | Harding | |
| 5,307,152 A | 4/1994 | Boehnlein et al. | |
| 5,500,737 A * | 3/1996 | Donaldson et al. .......... 356/606 |
| 5,636,025 A | 6/1997 | Bieman et al. | |
| 5,825,495 A | 10/1998 | Huber | |
| 5,835,218 A | 11/1998 | Harding | |
| 6,009,189 A * | 12/1999 | Schaack ..................... 382/154 |
| 6,040,910 A | 3/2000 | Wu et al. | |
| 6,084,712 A | 7/2000 | Harding | |
| 6,229,913 B1 | 5/2001 | Nayar et al. | |
| 6,252,623 B1 | 6/2001 | Lu et al. | |

(Continued)

FOREIGN PATENT DOCUMENTS

EP  1482275  1/2004

(Continued)

OTHER PUBLICATIONS

EP Search Report, EP0625799, Mar. 20, 2007.

(Continued)

*Primary Examiner*—Edward Raymond
(74) *Attorney, Agent, or Firm*—Penny A. Clarke

(57) ABSTRACT

A computer-implemented method, system, and computer program code are provided for characterizing an edge break, e.g., part features and/or geometric discontinuities that could give rise to edge sharpness, as may be encountered in a chamfer, bevel, fillet and other part features. The methodology enables to accurately and consistently determine in a manufacturing setting, for example, any applicable geometric parameter for characterizing the edge break.

19 Claims, 4 Drawing Sheets

U.S. PATENT DOCUMENTS

| | | |
|---|---|---|
| 6,438,272 B1 | 8/2002 | Huang et al. |
| 6,603,103 B1 | 8/2003 | Ulrich et al. |
| 6,636,255 B1 | 10/2003 | Kobayashi et al. |
| 6,639,685 B1 | 10/2003 | Gu et al. |
| 6,788,210 B1 | 9/2004 | Huang et al. |
| 6,825,937 B1 | 11/2004 | Gebauer et al. |
| 6,841,780 B2 | 1/2005 | Cofer et al. |
| 6,873,421 B2 | 3/2005 | Lim et al. |
| 6,910,278 B2 | 6/2005 | Holder |
| 6,912,888 B2 | 7/2005 | Stierle et al. |
| 6,945,124 B1 | 9/2005 | Leboeuf et al. |
| 7,324,677 B2 * | 1/2008 | Minor .................. 382/129 |
| 2002/0012004 A1 * | 1/2002 | Deering ................ 345/589 |

FOREIGN PATENT DOCUMENTS

| | | |
|---|---|---|
| WO | 0169172 | 9/2001 |

OTHER PUBLICATIONS

JP20000097672 Abstract.

J. Degrieck et al., "Application of digital phase-shift shadow Moire to micro deformation measurements of curved surfaces," Elsevier, Optics and Lasers in Engineering, vol. 36, 2001, pp. 29-40.

* cited by examiner

COMPUTER-IMPLEMENTED TECHNIQUES AND SYSTEM FOR CHARACTERIZING GEOMETRIC PARAMETERS OF AN EDGE BREAK IN A MACHINED PART

RELATED APPLICATION

The present invention is related to U.S. patent application Ser. No. 11/274,578, titled "Optical Edge Break Gage", assigned in common to the same assignee of the present invention, filed concurrently herewith and incorporated herein by reference in its entirety.

FIELD OF THE INVENTION

The present invention is generally related to measurement techniques in connection with the manufacturing of machined parts, and, more particularly, to a computer-implemented method, system, and computer program code for characterizing one or more geometric parameters of an edge break in a part.

BACKGROUND OF THE INVENTION

When parts, such as turbine airfoils, compressor fans, blade roots, etc., undergo manufacturing operations (e.g., machining), the edges formed in such parts may be relatively sharp. A sharp edge break or discontinuity may result in a section of thin material that may wear out quickly and crack when subjected to thermal and/or mechanical stress. Thus, it is desirable that the edge breaks on such parts be appropriately configured or shaped to achieve suitable mechanical properties. The accurate measurement and characterization of such edge breaks are presently time consuming and difficult to achieve.

Known measurement techniques for characterizing edge breaks in parts often require hand benching with concomitant planned and/or unplanned operations. For example, the planned operations may aim to finish corners or bends and generate drawing features while the unplanned operations may include rework and repair of nicks, dents and scratches that may be incurred during the handling of the part. Since such hand benching is manually performed, undesirable variation in the characterization of the edge breaks may be introduced due to differences in the training and/or skill level of the operator. Providing a high-level of training to the operators is costly and may not provide a fully satisfactory solution. For example, it has been observed that even two well-trained operators may obtain different results when evaluating the same edge break. Thus, it is desirable to provide automated techniques for quantitatively characterizing edge breaks not subject to the shortcomings noted above. It is further desirable to consistently achieve a relatively high degree of repeatability and accuracy for appropriately characterizing any applicable parameters for a given edge break.

BRIEF DESCRIPTION OF THE DRAWINGS

These and other advantages of the invention will be more apparent from the following description in view of the drawings that are made up of the following figures.

DETAILED DESCRIPTION OF THE INVENTION

Figure 1:
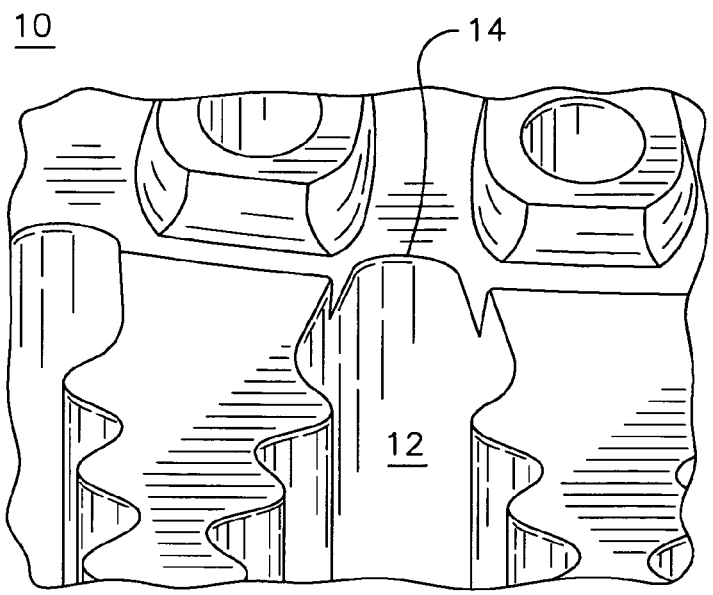
FIG. 1 illustrates an exemplary part including a slot with an edge break, such as a chamfer with rounded corners.

FIG. 1 illustrates an exemplary part 10, such as a blade root for a turbine blade, including a slot 12 that includes an edge break 14, such as a chamfer with rounded corners. Part features and/or geometric discontinuities that could give rise to edge sharpness, such as may be encountered in a chamfer, bevel, fillet and other part features will be referred to in the context of this description as an edge break.

Figure 2:
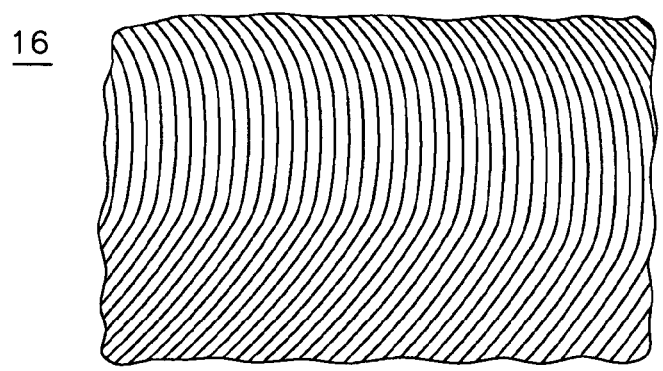
FIG. 2 illustrates a plurality of imaging fringe patterns corresponding to the edge break shown in FIG. 1.

FIG. 2 illustrates an image 16, e.g., made up of a plurality of imaging fringe patterns, corresponding to edge break 14, as may be obtained with an optical edge break sensor. For readers desirous of background information regarding an innovative hand-held optical edge break sensor developed by the same assignee of the present invention reference is made to U.S. patent application Ser. No. 11/274,578.

Figure 3:
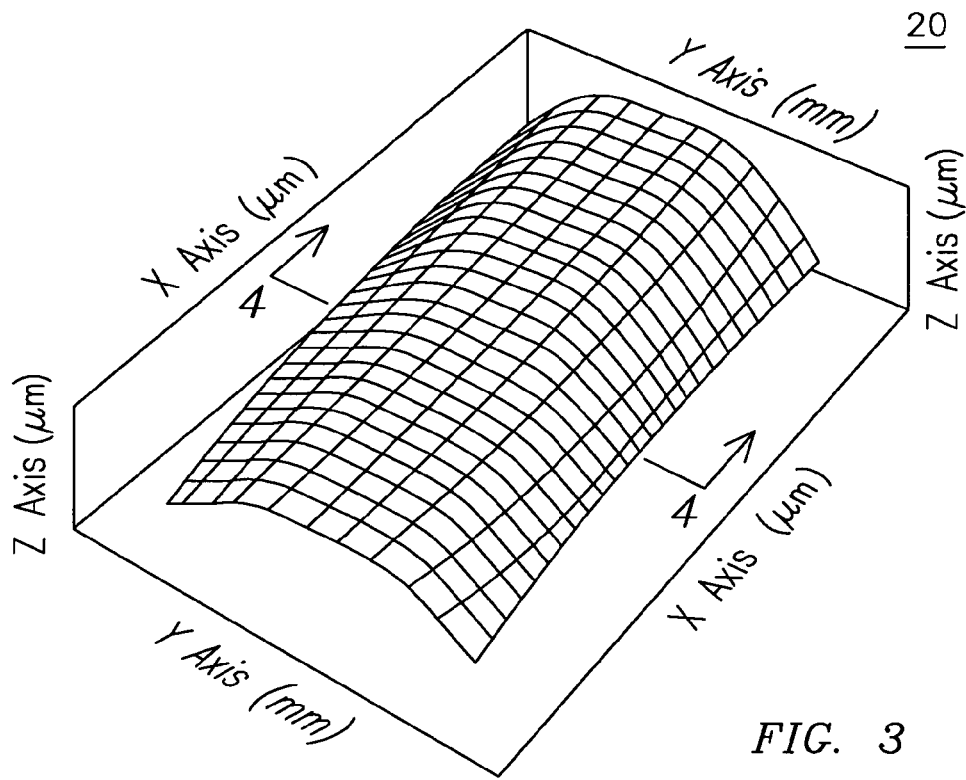
FIG. 3 illustrates exemplary three-dimensional (3-D) imaging data as may be computationally extracted from the fringe patterns shown in FIG. 2.
Figure 4:
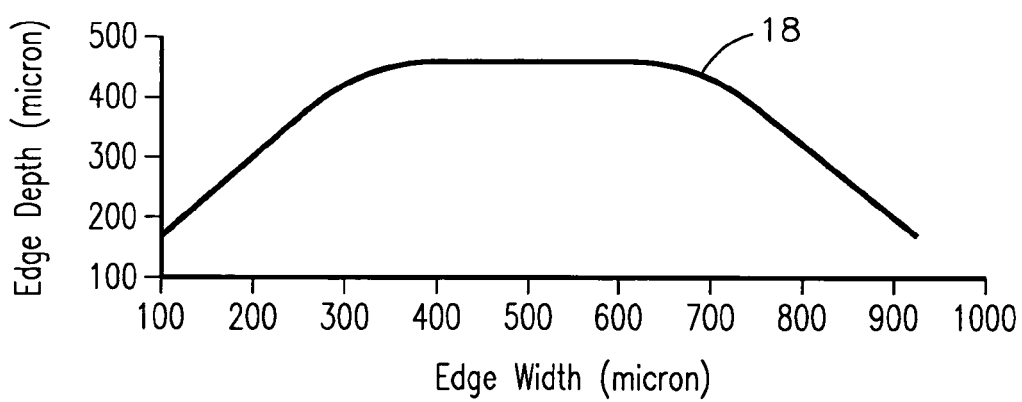
FIG. 4 illustrates a line indicative of an exemplary profile of the edge break shown in FIG. 1.

FIG. 4 illustrates a line 18 indicative of an exemplary profile of the edge break 14. In one exemplary embodiment line 18 represents a mathematical fit, such as along a cutting line 4-4 in the 3-D imaging data 20 (FIG. 3). Line 18 is made up of imaging points as may be computationally extracted from the imaging fringe patterns 16 obtained with the optical edge break sensor. Exemplary processing techniques for extracting the imaging data may include phase shifting, triangulation, and other optical processing techniques as will be understood by those skilled in the art.

Figure 5:
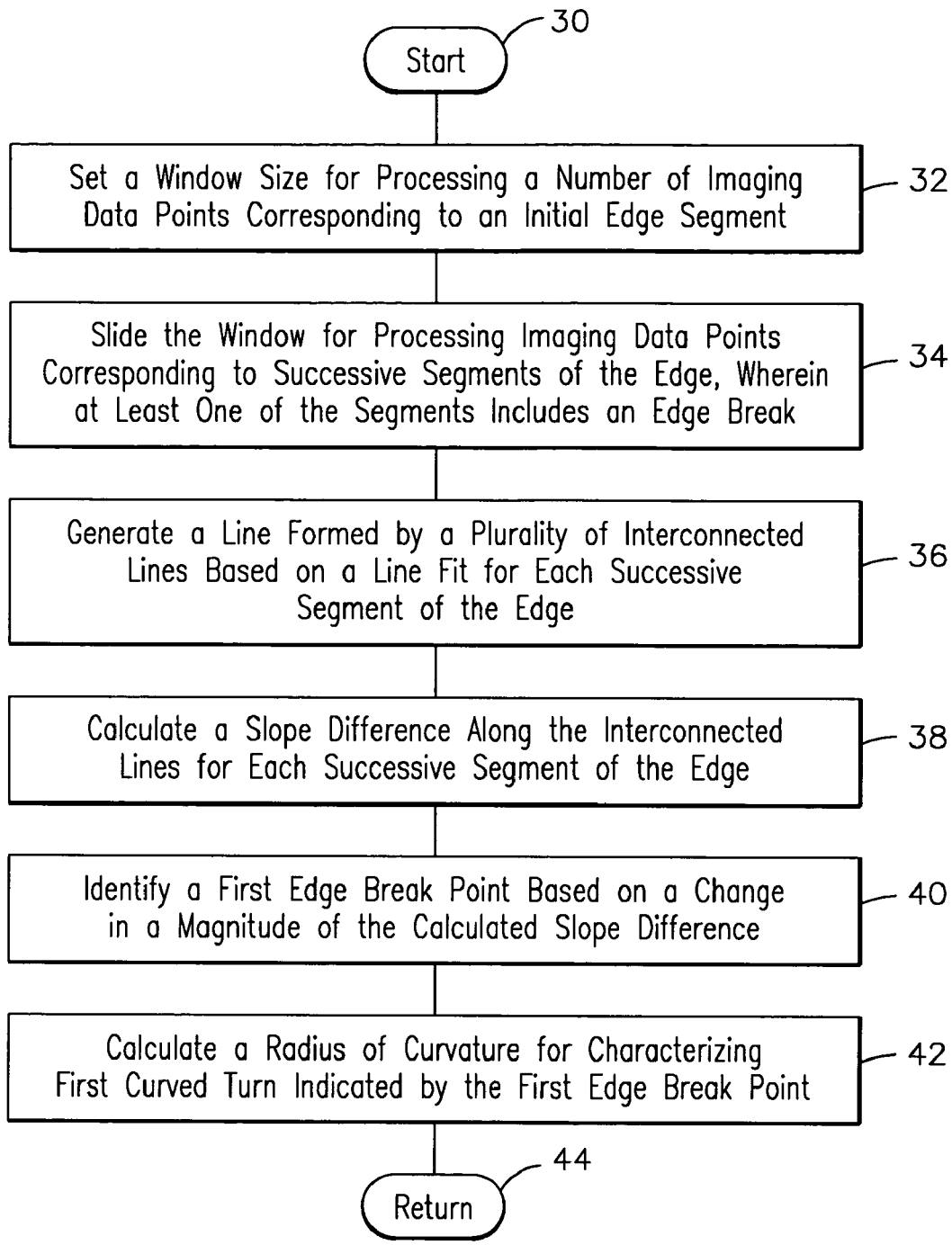
FIG. 5 is a flow chart depicting exemplary steps of a process embodying aspects of the present invention.

The inventors of the present invention have recognized an innovative computer-implemented technique for quantitatively characterizing, essentially in automated fashion, one or more geometric parameters of an edge break in a part. A flow chart depicting exemplary steps of a process embodying aspects of the present invention is illustrated in FIG. 5.

Figure 6:
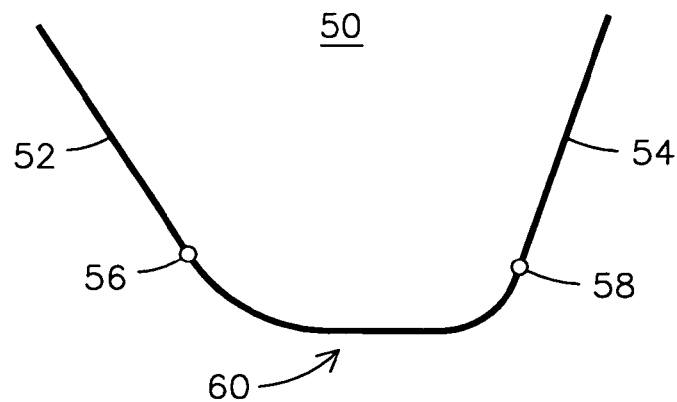
FIG. 6 shows exemplary parameters as may be used for characterizing an exemplary round edge.

Representative nomenclature for an exemplary bevel-type edge 50 is illustrated in FIG. 6. For example, bevel 50 includes two edges 52 and 54, two break points 56 and 58, and one intermediate region 60. In general, edges 52 and 54 may comprise lineal (or non-lineal) segments on each side leading into a respective edge break (e.g., a rounded corner). A breakpoint may be defined as the last point on an edge before the edge starts to exhibit a curved turn. The intermediate region is generally located between the two break points.

Possible exemplary methodology for characterizing this type of edge may include:

1. Determining the flatness of edges 52 and 54 within a specified tolerance.
2. Locating the intermediate region 60 within a specified tolerance zone.
3. Determining that no concavities are present in the intermediate region.

4. Determining respective radii that meet a specified minimum value for each curved turn.

In general, the flatness of the edges may be determined by calculating a linearity parameter over a number of edge points, e.g., a least square fit of a number of edge points fitted to a straight line. Accordingly, as further described below, an appropriate selection of the number of points to include is a consideration.

Returning to FIG. 4, subsequent to a start step 30, step 32 allows setting a window size for processing a selectable number of imaging data points corresponding to an initial segment of an edge. Step 34 allows sliding the window for processing respective imaging data points corresponding to successive segments of the edge, wherein at least one of the segments includes an edge break. In one exemplary embodiment, it has been empirically found that using approximately ⅓ of the points between a break point and the corresponding end point provides a sufficient size for the sliding window. It will be understood that the size of the sliding box is not limited to any specific size.

Figure 8:
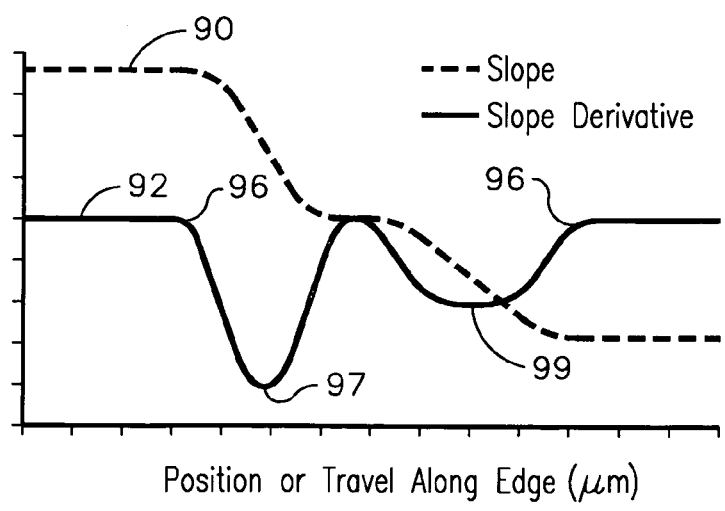
FIG. 8 shows an exemplary slope curve and a slope difference curve as may be used for characterizing an edge break.

Step 36 allows generating a line formed by a plurality of interconnected lines based on a line fit for each successive segment of the edge. The line plot seen in FIG. 6 is one example of such a generated line. Step 38 allows calculating a slope difference along the interconnected lines for each successive segment of the edge. The graph in FIG. 8 shows respective plots of calculated slopes and slope differences along the various segments of an exemplary edge.

Step 40 allows identifying a first edge break point based on a change in the magnitude of the calculated slope difference. The first edge break point is indicative of a first curved turn in the edge break. Point 56 in FIG. 6 is an example of a first edge break point and point 58 in the same figure is an example of a second edge break point. It will be appreciated that the break point locations may be used for determining compliance with the tolerance zone.

Figure 9:
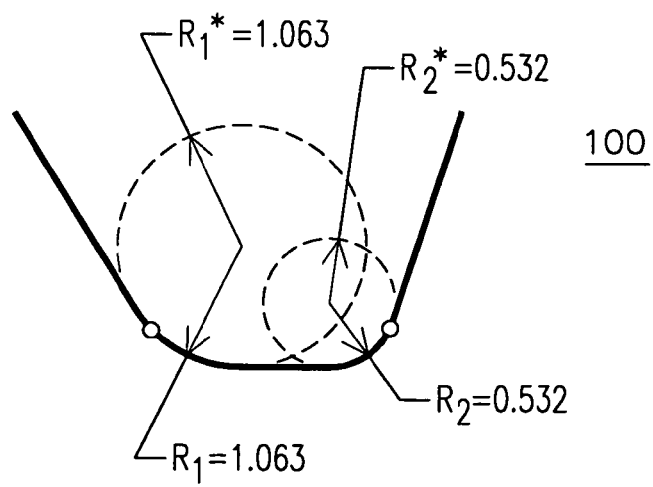
FIG. 9 shows a graphical report illustrating exemplary minimum circles for characterizing an edge break and including an exemplary comparison between nominal radii values and radii values calculated in accordance with aspects of the present invention.

Prior to return step 44, step 42 allows calculating a radius of curvature for characterizing the first curved turn. For example, radius R*1 in FIG. 9 represents such a radius. As noted above, the calculated radius should meet a specified minimum value for each curved segment. Similar calculation may be performed for characterizing a second curved turn, if any, which may be part of the edge break.

Figure 7:
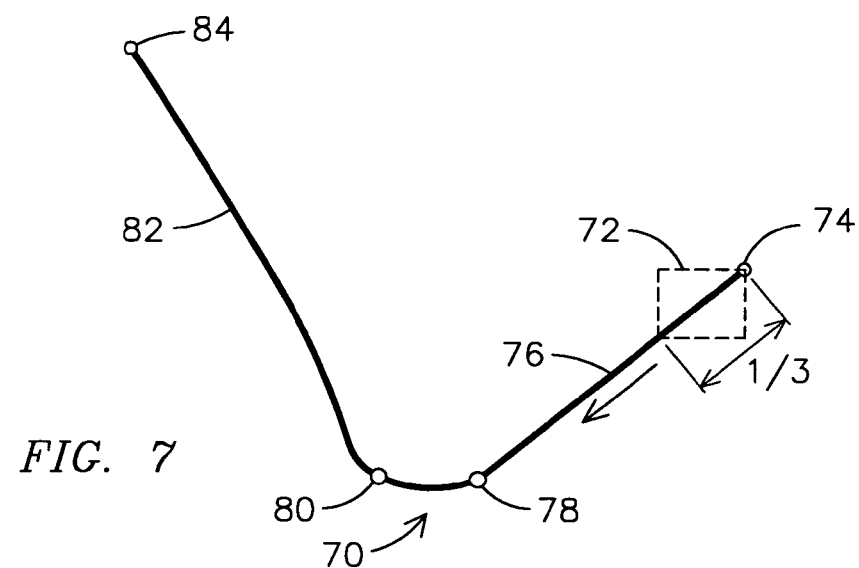
FIG. 7 shows an exemplary sliding window for selecting a number of data points to be processed in accordance with aspects of the present invention.

FIG. 7 illustrates an edge break comprising a single rounded bend 70 that may be characterized by a respective radius. FIG. 7 further illustrates a slidable window 72 that may slide from a start point 74, along a first edge 76 towards a first edge break point 78, along curved turn 70 and from a second edge break point 80 and along a second edge 82 towards an end point 84. It will be appreciated that one could start processing edge points from either end of the line.

In operation, by sliding the window along the modeled contour of the edge, a series of lines can be fitted using the number of points encompassed by the set window size. In accordance with basic mathematical principles, an approximated curvature map for the edge contour can be obtained by calculating the slope difference between any two adjacent lines.

FIG. 8 illustrates respective graphs of slope 90 calculations and slope difference 92 calculations for an exemplary edge. As seen on the graph for the slope difference, there are at least two locations 96 where there is a sign change in the slope derivative, i.e., an indication that the edge starts to curve. It can be shown that the local minimum values 97 and 99 on the contour can each be considered to be a respective position that corresponds to a respective minimum radius. Using straightforward mathematical concepts regarding the first derivative (slope) and the second derivative (slope difference) of a curve one can state the following:

1. Data along the horizontal axis in FIG. 8 corresponds to position of travel along the fitted lines for the various interconnected segments that make up the edge. Thus, calculation of the slope difference along the interconnected segments allows estimating a curvature map for the profile of the edge.
2. The flat edge segments essentially correspond to regions where the absolute value of the slope difference is zero. That is, the slope value is constant.
3. A break point is considered to be a transition point where the absolute value of the slope difference just starts to become non-zero. That is, the slope magnitude changes from a constant value to a varying condition.
4. Each minimum radius circle should be located to correspond with a respective minimum curvature (k) value.

As noted above, by using an algorithm embodying aspects of the present invention, one can accurately and consistently determine any applicable parameters for characterizing an edge break, such as fitted edge lines, break points and minimum circles. An exemplary report 100 is shown in FIG. 9 for graphically illustrating respective minimum circles for characterizing an edge break. The report includes an exemplary quantitative comparison between nominal radii values (R1 and R2) and radii values (R*1 and R*2) calculated in accordance with aspects of the present invention. It should be appreciated that the values for the calculated minimum radii using aspects of the present invention are substantially close to the values of the nominal radii.

It is contemplated that in operation aspects of the present can provide the following exemplary advantages:

1. Automation. The edge break evaluation process can be performed with minimal manual interaction from the operator.
2. High efficiency: The edge break determination can be executed in a few seconds just by clicking a single button or icon in a suitable user interface.
3. Intuitive report: The evaluation report of the edge may be provided not just with alphanumeric information but also may be displayed in an intuitive and user-friendly graphical user interface.
4. High Gage Repeatability and Reproducibility (GR&R): The edge brake evaluation is no longer operator-dependent. Consequently, a process embodying aspects of the present invention has very high repeatability and reproducibility.
5. User-friendly process. The edge break evaluation process can be standardized and can be adaptable to a manufacturing floor environment in a cost-effective manner.

It will be appreciated that aspects of the present invention can also be embodied as computer readable code on a computer readable medium. The computer readable medium may be any data storage device that can store data, which thereafter can be read by a computer system. Examples of computer readable medium include read-only memory, random-access memory, CD-ROMs, DVDs, magnetic tape, optical data storage devices. The computer readable medium can also be distributed over network coupled computer systems so that the computer readable code is stored and executed in a distributed fashion.

Based on the foregoing specification, aspects of the present invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for example, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer sub-system embodying aspects of the present invention.

While specific embodiments of the present invention have been shown and described herein, it will be understood that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A computer-implemented method for quantitatively characterizing one or more geometric parameters of an edge break in a part, said method comprising:
    setting a window size for processing a selectable number of imaging data points corresponding to an initial segment of an edge in the part;
    sliding the window for processing respective imaging data points corresponding to successive segments of the edge, at least one of said segments comprising an edge break in the part;
    generating a line formed by a plurality of interconnected lines based on a line fit for each successive segment of the edge;
    calculating a slope difference along the interconnected lines for each successive segment of the edge;
    identifying a first edge break point based on a change in a magnitude of the calculated slope difference, said first edge break point indicative of a first curved bend in the edge break; and
    calculating a radius of curvature for characterizing said first curved bend.

2. The computer-implemented method of claim 1 further comprising identifying a second edge break point based on another change in the magnitude of the calculated slope difference, said second edge break point indicative of a second curved bend in said edge break.

3. The computer-implemented method of claim 2 further comprising calculating a radius of curvature for characterizing said second curved bend.

4. The computer-implemented method of claim 3 further comprising displaying through a user interface panel alphanumeric information regarding the radius of curvature that characterizes the first curved bend, and the radius of curvature that characterizes the second curved bend, if any, for the edge break.

5. The computer-implemented method of claim 3 further comprising displaying through a user interface panel graphical information regarding the radius of curvature that characterizes the first curved bend, and the radius of curvature that characterizes the second curved bend, if any, for the edge break.

6. The computer-implemented method of claim 1 wherein said edge break is selected from the group consisting of a chamfer, a bevel, a rounded edge, and any combination thereof.

7. An article of manufacture comprising a computer program product comprising a computer-usable medium having a computer-readable code therein for quantitatively characterizing one or more geometric parameters of an edge break in a part, the computer-readable code comprising:
    computer-readable code responsive to an adjustable window size for processing a selectable number of imaging data points corresponding to an initial segment of an edge in the part;
    computer-readable code for sliding the window to process respective imaging data points corresponding to successive segments of the edge, at least one of said segments comprising an edge break in the part;
    computer-readable code for generating a line formed by a plurality of interconnected lines based on a line fit for each successive segment of the edge;
    computer-readable code for calculating a slope difference along the interconnected lines for each successive segment of the edge;
    computer-readable code for identifying a first edge break point based on a change in a magnitude of the calculated slope difference, said first edge break point indicative of a first curved bend in said edge break; and
    computer-readable code for calculating a radius of curvature for characterizing said first curved bend.

8. The article of manufacture of claim 7 further comprising computer-readable code for identifying a second edge break point based on another change in the magnitude of the calculated slope difference, said second edge break point indicative of a second curved bend in said edge break.

9. The article of manufacture of claim 8 further comprising computer-readable code for calculating a radius of curvature for characterizing said second curved bend.

10. The article of manufacture of claim 9 further comprising computer-readable code for displaying through a user interface panel alphanumeric information regarding the radius of curvature that characterizes the first curved bend, and the radius of curvature that characterizes the second curved bend, if any, for the edge break.

11. The article of manufacture of claim 9 further comprising computer-readable code for displaying through a user interface panel graphical information regarding the radius of curvature that characterizes the first curved bend, and the radius of curvature that characterizes the second curved bend, if any, for the edge break.

12. The article of manufacture of claim 7 wherein said edge break is selected from the group consisting of a chamfer, a bevel, a rounded edge, and any combination thereof.

13. A system for quantitatively characterizing one or more geometric parameters of an edge break in a part, the computer-readable code comprising, comprising:

a user-interface for setting a window size for processing a selectable number of imaging data points corresponding to an initial segment of an edge in the part;

a processor for sliding the window for processing respective imaging data points corresponding to successive segments of the edge, at least one of said segments comprising an edge break in the part;

a processor for generating a line formed by a plurality of interconnected lines based on a line fit for each successive segment of the edge;

a processor for calculating a slope difference along the interconnected lines for each successive segment of the edge;

a processor for identifying a first edge break point based on a change in a magnitude of the calculated slope difference, said first edge break point indicative of a first curved bend in the edge break; and a processor for calculating a radius of curvature for characterizing said first curved bend.

14. The system of claim 13 wherein a single processor unit constitutes said processors.

15. The system of claim 13 further comprising a processor for identifying a second edge break point based on another change in the magnitude of the calculated slope difference, said second edge break point indicative of a second curved bend in said edge break.

16. The system of claim 15 further comprising a processor for calculating a radius of curvature for characterizing said second curved bend.

17. The system of claim 16 further comprising a user display for displaying through a user interface panel alphanumeric information regarding the radius of curvature that characterizes the first curved bend, and the radius of curvature that characterizes the second curved bend, if any, for the edge break.

18. The system of claim 17 further comprising a user display for displaying through a user interface panel graphical information regarding the radius of curvature that characterizes the first curved bend, and the radius of curvature that characterizes the second curved bend, if any, for the edge break.

19. The system of claim 13 wherein said edge break is selected from the group consisting of a chamfer, a bevel, a rounded edge, and any combination thereof.

* * * * *